C. H. KICKLIGHTER.
ELECTRIC WELDING.
APPLICATION FILED DEC. 15, 1916.

1,236,091.

Patented Aug. 7, 1917.
3 SHEETS—SHEET 1.

WITNESSES:
H. K. Phillips
E. H. Stevens

INVENTOR
Charles H. Kicklighter.

C. H. KICKLIGHTER.
ELECTRIC WELDING.
APPLICATION FILED DEC. 15, 1916.
1,236,091.
Patented Aug. 7, 1917.
3 SHEETS—SHEET 2.
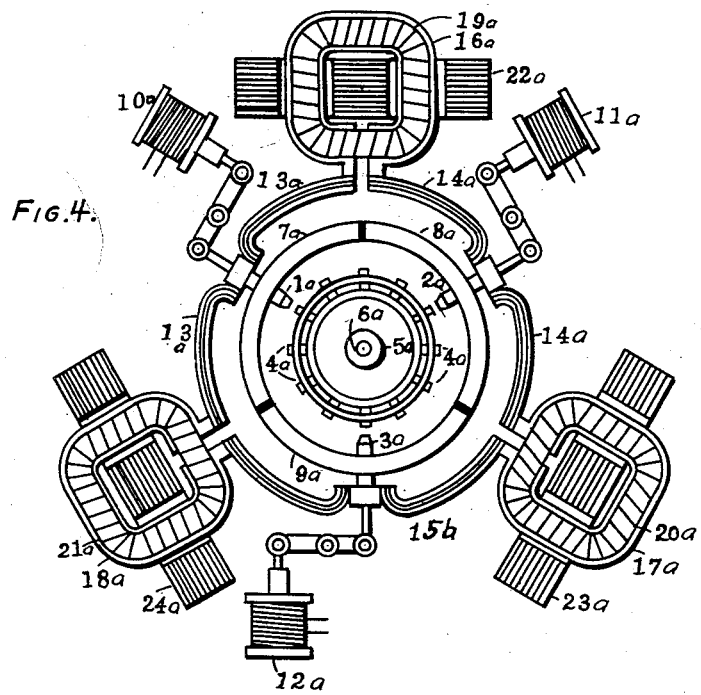
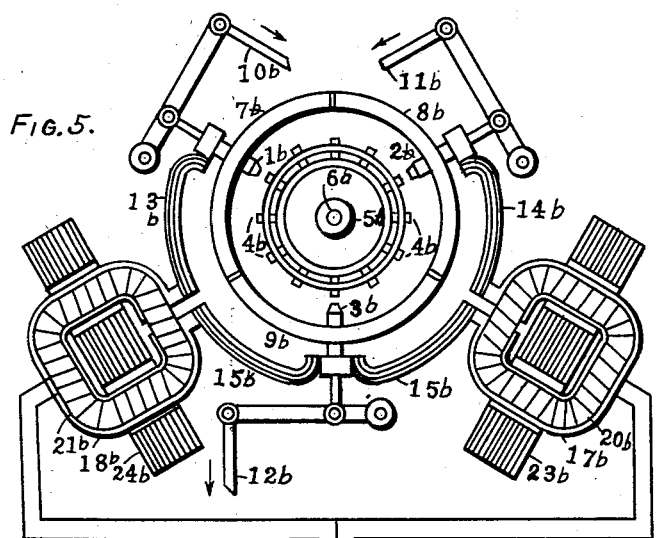
WITNESSES:
INVENTOR
Charles H. Kicklighter.

C. H. KICKLIGHTER.
ELECTRIC WELDING.
APPLICATION FILED DEC. 15, 1916.

1,236,091.

Patented Aug. 7, 1917.
3 SHEETS—SHEET 3.

WITNESSES:

INVENTOR
Charles. H. Kicklighter.

UNITED STATES PATENT OFFICE.

CHARLES H. KICKLIGHTER, OF MACON, GEORGIA.

ELECTRIC WELDING.

1,236,091.  Specification of Letters Patent.  Patented Aug. 7, 1917.

Application filed December 15, 1916. Serial No. 137,194.

*To all whom it may concern:*

Be it known that I, CHARLES H. KICK-LIGHTER, a citizen of the United States, residing at Macon, in the county of Bibb and State of Georgia, have invented new and useful Improvements in Electric Welding, of which the following is a specification.

My invention relates to an apparatus and method for electric welding and its object is to provide an apparatus and method for making a plurality of welds simultaneously by the use of poly-phase currents.

Briefly stated, the apparatus consists of a bank of transformers disposed around the position of the work and adapted to apply three-phase welding currents to a plurality of points disposed around a circular seam in a metal cylinder. Means are also provided for collecting and reuniting these currents, after their passage through the work, on a member or members of neutral potential within the cylinder. The method consists of passing the three-phase currents radially through the circular seam and reuniting the currents on a member of neutral potential within the cylinder.

Fig. 4 illustrates a three-phase electric welder with secondaries delta-connected, the transformers being disposed so as to surround and to be in close proximity with the cylindrical work.

Fig. 5 illustrates a three-phase electric welder similar to Fig. 4, but with the two secondaries having an open-delta-connection.

Figure 1:
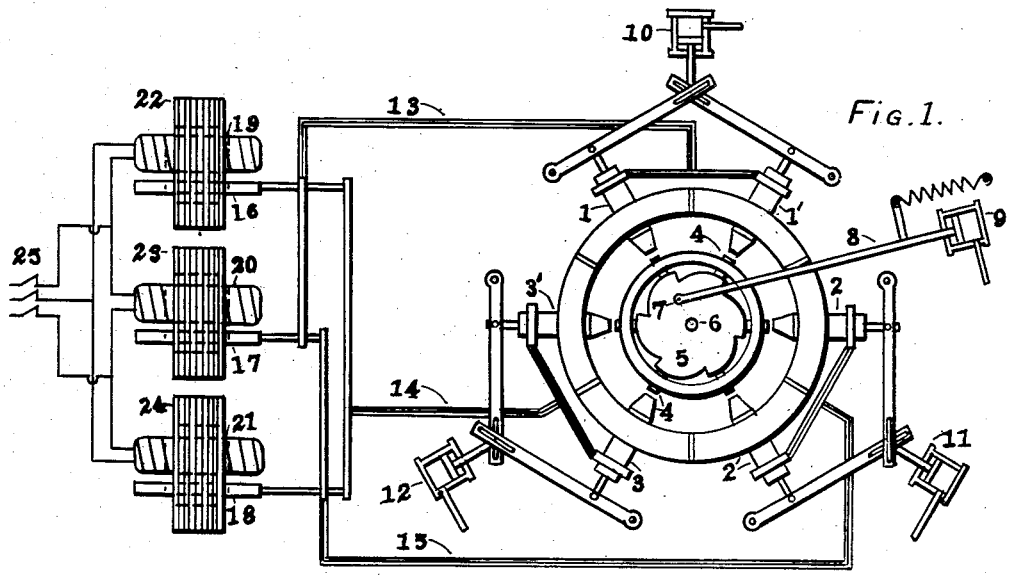
Figure 1 is a sketch illustrating a three-phase electric welding machine with the secondaries delta-connected and adapted to weld a circular seam in a metal cylinder at a plurality of points disposed around said seam.

Fig. 1 illustrates a welding apparatus, consisting of a set of transformers with their secondaries 16, 17 and 18 delta-connected in the usual way so as to give three-phase current. The transformer cores are noted by 22, 23 and 24, respectively. The primaries 19, 20 and 21 are connected through switch 25 to the supply. The conductors 13, 14 and 15 connect the transformer secondaries to the welding terminals 1—1', 2—2' and 3—3' which are adapted to be forced against the work by hydraulic or pneumatic pressure in cylinders 10, 11 and 12. Opposite to these welding terminals are disposed a plurality of welding pieces or terminals 4—4, directly inter-connected and adapted to be forced radially outward against the work by a cam-wheel 5. This cam-wheel may be rotated through a small angle about the shaft 6 by pressure in cylinder 9 acting through piston rod 8 and crank pin 7. Switch 25 connects the primaries to the transmission line.

Figure 2:
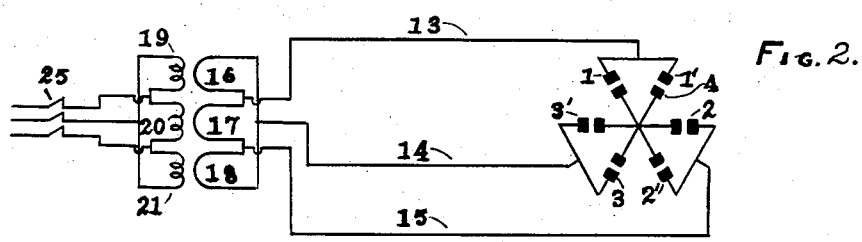
Fig. 2 is a diagram of the electric connections in Fig. 1.

Fig. 2 illustrates the electrical connections of the apparatus of Fig. 1. The primaries 19—20—21 and the secondaries 16—17—18 are here shown delta-connected. The welding pieces 4 are here shown directly inter-connected, thus forming a member of neutral potential. Here the three-phase welding currents reunite within the cylindrical work.

Figure 3:
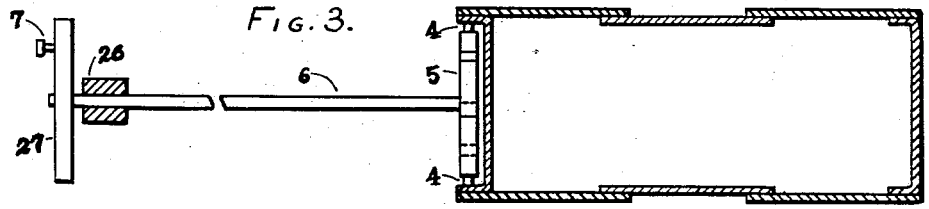
Fig. 3 is a sectional side-view of the metallic cylinder and a portion of the welding apparatus of Fig. 1, which is adapted to insert within the cylinder.

Fig. 3 illustrates the head of a metal cylinder with the welding pieces 4—4 forced radially outward against the interior circumference thereof. The cam wheel 5 is connected by a shaft 6 to a crank-disk 27. The crank pin is noted by 7, and 26 is a bearing for the shaft 6. By means of this shaft the welding pieces 4—4 may be inserted a long distance into a cylindrical shell or pipe. Fig. 4 illustrates a welding apparatus in which a set of three-phase secondaries 16$^a$, 17$^a$ and 18$^a$ are delta-connected in the usual way. 19$^a$, 20$^a$ and 21$^a$ illustrate the corresponding primaries and 22$^a$, 23$^a$ and 24$^a$ their cores. The diagram of electric connections is the same as that shown in Fig. 2. The transformers are arranged so as to surround the work, and the secondary leads or conductors 13$^a$—14$^a$—15$^a$ with the transformer secondaries form an unbroken circumference or yoke about the work. The yoke-arcs 7$^a$—8$^a$—9$^a$ form a complete circumference about the work for supporting and guiding the welding terminals 1$^a$, 2$^a$ and 3$^a$. These terminals are adapted to be forced downward firmly by electro-magnets $10^a$, $11^a$, and $12^a$ against the work opposite to welding pieces $4^a$—$4^a$. These welding pieces $4^a$—$4^a$ are adapted to be pressed out radially against the work by a conical sleeve $5^a$ sliding on shaft $6^a$.

Fig. 5 illustrates a welding apparatus consisting of a bank of three-phase transformers with the secondaries having an open-delta-connection, as is well understood in the art. Only two transformer secondaries $17^b$ and $18^b$ are necessary. $20^b$ and $21^b$ illustrate the corresponding primaries and $23^b$ and $24^b$ their cores respectively. The welding terminals $1^b$, $2^b$ and $3^b$ are adapted to be forced radially inward by rods $10^b$, $11^b$ and $12^b$ against the work opposite to welding pieces $4^b$. Rods $10^b$, $11^b$ and $12^b$ may be appropriately connected to a hand lever, electromagnets, or pneumatic means for forcing the welding terminals against the work. The welding pieces $4^b$—$4^b$ are adapted to be pressed out radially against the work by conical sleeve $5^b$ on shaft $6^b$. $13^b$, $14^b$ and $15^b$ denote the secondary leads, and $7^b$, $8^b$, and $9^b$ the yokes for supporting and guiding the welding terminals $1^b$, $2^b$ and $3^b$.

Figure 6:
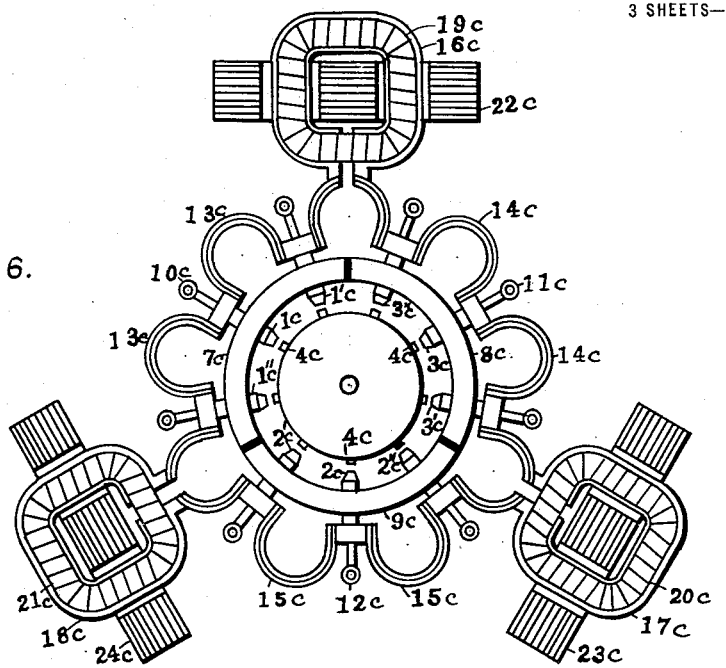
Fig. 6 illustrates a three-phase electric welder with secondaries delta-connected and having a plurality of welding terminals per secondary conductor.

Fig. 6 illustrates a welding apparatus having a set of three-phase secondaries $16^c$, $17^c$ and $18^c$ delta-connected. Each phase is provided with a plurality of welding terminals $1^c$—$1'^c$—$1''^c$, $2^c$—$2'^c$—$2''^c$, and $3^c$—$3'^c$—$3''^c$. These welding terminals may all be applied and used simultaneously or they may be applied in sets of threes similarly situated as $1^c$—$2^c$—$3^c$ or $1'^c$—$2'^c$—$3'^c$, or $1''^c$—$2''^c$—$3''^c$. One method would be first to make three welds by applying welding terminals $1^c$—$2^c$—$3^c$ and exciting the transformers, second to make three intermediate welds by applying terminals $1'^c$—$2'^c$—$3'^c$ and exciting the transformers, and third to make three more intermediate welds by applying terminals $1''^c$—$2''^c$—$3''^c$ and exciting the transformers, etc. The loops in the secondary conductors $13^c$, $14^c$ and $15^c$ are necessary to afford greater flexibility for the independent motion of the welding terminals. The rods $10^c$, $11^c$ and $12^c$ are provided for connecting to appropriate mechanical means so as to force down the welding terminals $1^c$—$2^c$—$3^c$, etc., against the work opposite to welding pieces $4^c$—$4^c$—$4^c$.

Figure 7:
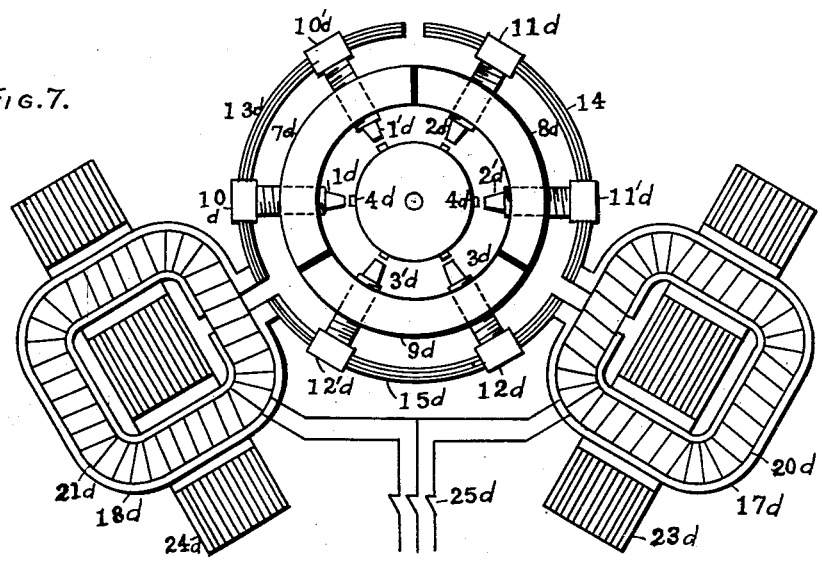
Fig. 7 illustrates a three-phase electric welder with secondaries having an open-delta-connection and each secondary conductor provided with a plurality of current pressure blocks.

Fig. 7 illustrates a welding apparatus consisting of a bank of three-phase transformers having open delta-connection. Means are provided for first screwing down all welding terminals into the yoke $7^d$—$8^d$—$9^d$ so as to clamp the work against the contact pieces $4^d$—$4^d$. After this the current-pressure blocks $10^d$—$10'^d$—$11^d$—$11'^d$ and $12^d$—$12'^d$ to which are connected the secondary leads $13^d$—$14^d$—$15^d$ respectively, are applied to the projecting ends of the welding terminals. The currents may be passed from all of these welding terminals simultaneously or may be passed from them in sets of threes, as, first from $1^d$—$2^d$—$3^d$, second from $1'^d$—$2'^d$—$3'^d$, etc.

The operation is apparent. Referring again to Figs. 1, 2 and 3, and especially to Fig. 1,—the circular seam of the cylinder is inserted around the welding pieces 4—4 and is brought between them and the oppositely disposed welding terminals 1—$1'$—2—$2'$—3—$3'$. Hydraulic or pneumatic is admitted into cylinders 9, 10, 11 and 12. The pressure in cylinder 9 thrusts the piston rod 8 forward, acts upon pin 7, rotates the shaft 6 and the cam disk 5 through a small angle and forces the welding pieces 4—4 radially outward against the cylindrical seam. The pressures in cylinders 10, 11 and 12 act through appropriate link work to force the welding terminals radially inward against the cylindrical seam. The supply switch 25 is now closed. The three-phase primary currents in the primaries 19, 20, and 21 induce secondary currents in secondaries 16, 17 and 18 respectively. The welding currents pass by leads 13, 14 and 15 to welding terminals 1—$1'$, 2—$2'$ and 3—$3'$ and thence through the metal of the seam to the opposing welding pieces 4—$4'$, which are inter-connected and are of neutral potential and on which the phase currents reunite. When the current has passed sufficiently long to produce the desired welds in the circular seam, the switch 25 is opened and the pressure in cylinders 9, 10, 11 and 12 released. The work may be turned through a small angle about axis 6 in order to make another series of intermediate welds between the above, and the process repeated.

The operation in all of the illustrations is essentially the same. However, in order to make the operation as plain as possible attention is directed again to Fig. 6. In this apparatus all of the welding terminals could be applied simultaneously but it seems more advantageous to apply these in sets of threes. The circular seam of the cylinder is inserted around welding pieces $4^c$—$4^c$ and is brought between them and the oppositely disposed terminals $1^c$, $2^c$, $3^c$, etc. Welding terminals $1^c$—$2^c$—$3^c$ are first forced down by mechanical pressure against the work opposite to welding pieces $4^c$—$4^c$—$4^c$, and the primary windings $19^c$—$20^c$—$21^c$ are excited. Welding currents in three-phase relation pass from the transformer secondaries $16^c$—$17^c$—$18^c$, the coductors $13^c$—$14^c$—$15^c$ and the welding terminals $1^c$—$2^c$—$3^c$ through the metal of the seam to the welding pieces $4^c$—$4^c$ on which these currents reunite. The heat caused by the passage of the current through the seam, in conjunction with the mechanical pressure, causes the metal directly between the welding terminals to become fused. The heating current is now discontinued, the terminals 1ᶜ—2ᶜ—3ᶜ raised, the terminals 1′ᶜ—2′ᶜ—3′ᶜ are now forced against the work, the welding current again passed through the seam, and three more welds made. Thereupon the heating current is discontinued, these terminals raised, the terminals 1″ᶜ—2″ᶜ—3″ᶜ are forced against the work, the welding current again passed through the seam and three more welds made, and so on.

What I claim is:

1. The method of welding two pieces of metal together along a circular seam, consisting in applying to a series of points disposed around the outside circumference thereof a plurality of currents in different phase relation and in conveying said currents through the parts to be welded to a point of common union within the circular seam.

2. The method of fastening two pieces of metal together along a circular seam, consisting in applying to a plurality of points disposed around the outside circumference thereof a plurality of currents in three-phase relation and in directly uniting said currents within the circular seam after their passage through the parts to be heated.

3. The method of forming a spot welded circular seam in a sheet metal cylinder by the use of pointed electrodes, consisting in bringing the electrodes in contact with the seam at points distributed around the circumference thereof, in passing from said electrodes a plurality of electric currents in three-phase relation and in conveying said currents respectively from their points of application through the parts to be welded directly to a point of neutral potential within.

4. The method of forming a circular seam in sheet metal, consisting in applying welding electrodes to the sheet metal at a plurality of points disposed around the whole circumference of the circle and then conducting from said electrodes through the sheet metal to a point of common union within a plurality of currents in three-phase relation.

5. The method of fastening two pieces of sheet metal together along a circular seam, consisting in applying a plurality of currents in different phase relation to points disposed around the circumference thereof and in conveying said currents respectively from their points of application through the parts to be heated directly to a point of neutral potential within.

6. The method of forming a circular seam in sheet metal, consisting in applying a plurality of currents in three-phase relation to the sheet metal at a plurality of points disposed around the whole circumference of the circle, in conducting said currents through the sheet metal at said points, in directly uniting the currents within the circular seam, in thereafter applying a plurality of currents in three-phase relation to intermediate points around the circumference along the line of seam, in conducting these currents through the sheet metal and in directly uniting them within the circumference of the seam.

7. In an electric metal working apparatus for forming seams in a metal cylinder, the combination of a set of inter-connected polyphase transformers so disposed as to surround and be in close proximity to said cylinder, of a plurality of work engaging electrodes connected to the secondaries of the polyphase transformers and adapted to contact with points on the outside of the said cylinder, of a plurality of inter-connected work engaging members disposed opposite to said electrodes and adapted to contact with points on the inside of the said cylinder.

8. In an electric metal working apparatus for forming seams in a metal cylinder, the combination of a plurality of inter-connected polyphase transformers so disposed as to surround and be in close proximity to said cylinder of means for applying polyphase currents from the transformer secondaries to points disposed along the outside of said cylinder and means for conducting said currents from corresponding directly opposite points on the inside of the cylinder to a point of common union.

9. In an electric metal working apparatus for forming a circular seam, the combination of a bank of three-phase transformers so disposed as to surround and be in close proximity to said seam, of a plurality of engaging electrodes connected to the transformer secondaries and of a plurality of inter-connected contact points disposed opposite to said former engaging electrodes.

10. In an electric metal working apparatus for spot welding a circular seam, the combination of a bank of transformers three-phase connected and so disposed as to surround and be in close proximity to said circular seam, of a plurality of welding electrodes connected to the secondaries of the transformers and adapted to contact with the circular seam at points disposed along the outside circumference thereof, and of a plurality of welding terminals, interconnected, disposed opposite to aforesaid welding electrodes, and adapted to contact with the circular seam at points disposed along the inside circumference thereof.

11. An electric metal working apparatus, consisting of a circular yoke adapted to surround the work, of engaging electrodes connected to said yoke at various points disposed along the circumference thereof, of means for maintaining three portions of the yoke at electrical potentials having a three-phase relation and of another set of engaging electrodes, electrically inter-connected, disposed opposite to the aforesaid engaging electrodes, and adapted to be surrounded by the work.

12. In an electric metal working apparatus for forming seams in a metal cylinder, the combination of a set of inter-connected polyphase transformer secondaries so disposed as to lie around the cylinder, of a plurality of work engaging electrodes connected to the transformer secondaries and adapted to contact with points on the outside of said cylinder, and of a member so disposed as to lie within the cylinder and adapted to unite the polyphase currents which may be delivered by said engaging electrodes after the passage of such currents through the seam of the metal cylinder.

In witness whereof, I have hereunto signed my name in the presence of two subscribing witnesses at Macon, in the county of Bibb and State of Georgia, this 13th day of December, 1916.

CHARLES H. KICKLIGHTER.

Witnesses:
B. F. HALE,
R. F. FINCHER.